Figure 1:
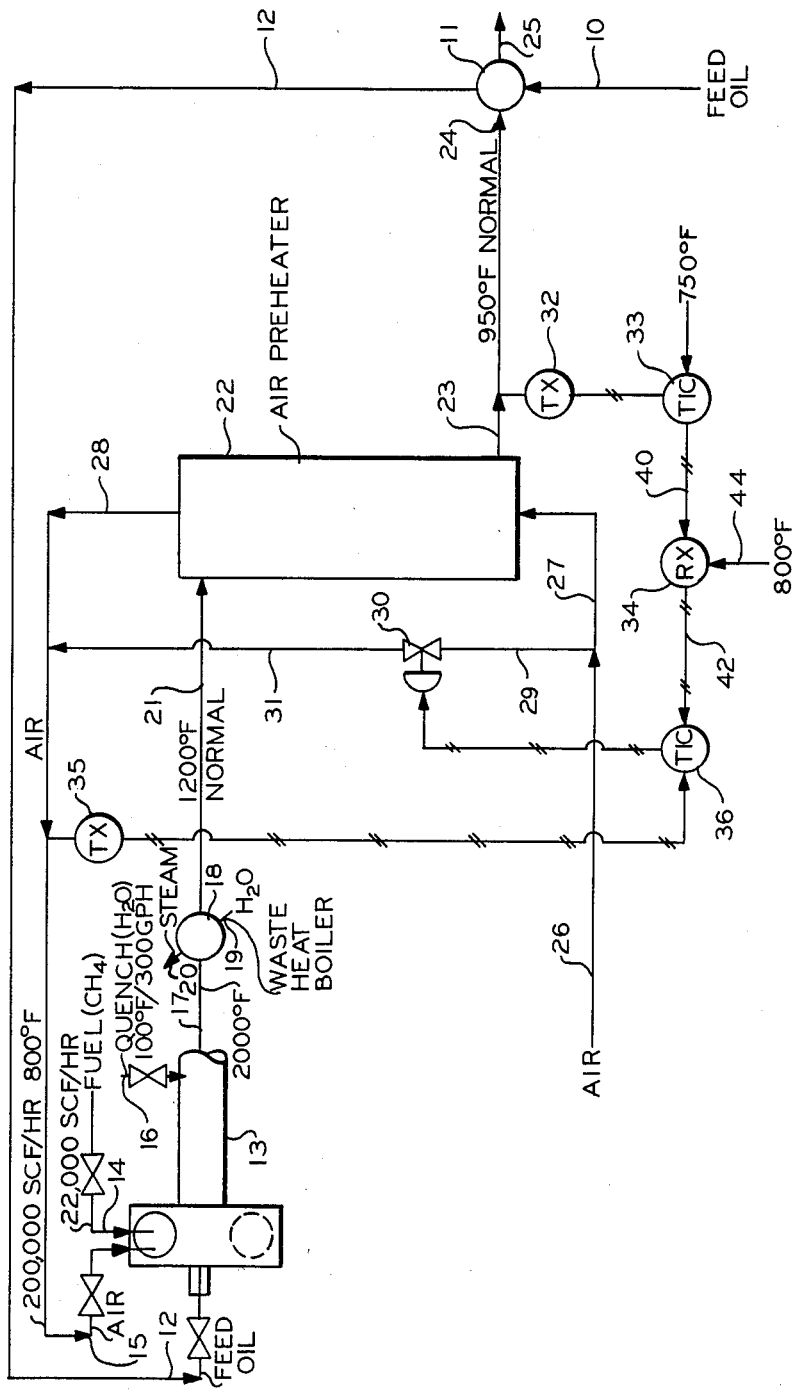

United States Patent [19]

Rogers

[11] Patent Number: 4,737,531
[45] Date of Patent: Apr. 12, 1988

[54] WASTE HEAT RECOVERY

[75] Inventor: David L. Rogers, Bartlesville, Okla.

[73] Assignee: Phillips Petroleum Co., Bartlesville, Okla.

[21] Appl. No.: 694,540

[22] Filed: Jan. 24, 1985

[51] Int. Cl.[4] .................. C01B 31/02; C09C 1/48
[52] U.S. Cl. .................. 423/450; 423/449; 423/DIG. 5; 422/109; 422/150; 422/156; 422/158; 165/36; 165/103; 165/901; 165/921
[58] Field of Search .................. 165/39, 103, 134.1, 165/35, 36, 34, 909, 901, 921; 423/450, 449, DIG. 5; 422/62, 150, 151, 156, 157, 158, 109

[56] References Cited

U.S. PATENT DOCUMENTS

| | | | |
|---|---|---|---|
| 1,941,365 | 12/1933 | Patterson et al. | 165/134.1 |
| 2,570,859 | 10/1951 | Rasmussen | 165/134.1 |
| 3,095,273 | 4/1961 | Austin | 23/209.6 |
| 3,172,729 | 3/1965 | de Galocsy | 23/209.4 |
| 3,310,379 | 3/1967 | Hinson et al. | 423/450 |
| 3,377,137 | 4/1968 | Latham, Jr. | 423/450 |
| 3,438,732 | 4/1969 | Morel | 423/450 |
| 3,668,078 | 6/1972 | Holland | 203/3 |
| 4,112,060 | 9/1978 | Fross | 423/450 |
| 4,138,062 | 2/1979 | Graden | 165/901 |
| 4,215,741 | 8/1980 | Averbuch et al. | 165/909 |
| 4,295,519 | 10/1981 | Bellaff | 165/921 |
| 4,302,423 | 11/1981 | Cheng et al. | 423/450 |
| 4,316,876 | 2/1982 | Mills et al. | 422/151 |
| 4,371,027 | 2/1983 | Jacobsen | 165/35 |
| 4,405,440 | 9/1983 | Gwyn | 208/48 Q |
| 4,460,558 | 7/1984 | Johnson | 423/449 |

FOREIGN PATENT DOCUMENTS

560101  6/1977  U.S.S.R. .................. 165/921

Primary Examiner—William R. Cline
Assistant Examiner—John K. Ford
Attorney, Agent, or Firm—A. W. Umphlett

[57] ABSTRACT

In a heat exchange unit that recovers waste heat from carbon black smoke by preheating oxygen-containing gas such as air being passed to a carbon black producing reactor, a control loop is provided that automatically diverts the oxygen-containing gas being preheated through a by-pass line if the temperature of the effluent smoke being removed from the heat exchange is below a minimum temperature value in order to minimize the deposition of carbon on the heat exchange surfaces in said heat exchange zone.

2 Claims, 1 Drawing Sheet

WASTE HEAT RECOVERY

BACKGROUND OF THE INVENTION

This invention relates to method and apparatus for the transfer of heat from gases containing entrained solids. In accordance with another aspect, this invention relates to carbon black production and to an improved method and apparatus for perheating an oxygen-containing gas, such as air being passed to a carbon black production furnace. In accordance with a further aspect, this invention relates to a control system for controlling the flow of an oxygen-containing gas, such as air used for supporting combustion in a carbon black furnace passed in indirect heat exchange with carbon black effluent reaction smoke. In accordance with a further aspect, this invention relates to a control system which manipulates the flow of oxygen-containing gas around a preheater responsive to temperatures falling below a predetermined minimum for the carbon black smoke exiting from the preheater.

Various procedures are known for preparing carbon black by the breakdown of gaseous or vaporized hydrocarbons through incomplete combustion. In the production of carbon black by incomplete combustion of an oil feed stock in a carbon black furnace or reactor, it has been found that the effluent from the carbon black reaction provides an economical source of heat to preheat combustion air or oil feed, produce steam, and the like. The carbon black furnace or reactor effluent has ample temperature for preheating various streams passed to the individual furnaces but the reactor effluent temperature is not constant. Variation in the rate of introduction of quench water at the outlet end of the carbon black reactor obviously causes variation in effluent temperature. Also, variations in quench water rate of flow alters the temperature of the furnace effluent. The rate of flow of reactor effluent varies also for other reasons, as from irregularity in gas and air flow tangentially into the furnace as well as variations in flow of charge stock to the furnace. All of these variations and irregularities in flow directly cause variations of reactor effluent temperatures. Furthermore, streams to be heated entering the indirect heat exchange units can vary somewhat in temperature as from day to night and night to day.

In some instances the carbon black reactor effluent stream temperature drops too low, which causes low velocities and in turn brings about fouling of the indirect heat exchange surfaces used to preheat air or other materials. The present control system maintains the temperature of the carbon black reactor effluent exiting the preheater above a minimum level, thereby minimizing deposition of carbon on the heat exchange surfaces.

Accordingly, an object of this invention is to provide an improved waste heat recovery system.

Another object of the invention is to provide a method and apparatus for utilizing available heat from a carbon black furnace effluent.

Still another object of the invention is to provide a method and apparatus for preheating air to a carbon black furnace.

Another object of this invention is to provide a control system for regulating the flow of heat exchange fluids so as to minimize fouling of heat exchange surfaces.

Other objects, aspects, as well as the several advantages of the invention will be apparent to those skilled in the art upon reading the specificiation, drawing, and appended claims.

The drawing illustrates, in diagrammatic form, one arrangement of apparatus parts for carrying out the objects and realizing the advantages of this invention.

SUMMARY OF THE INVENTION

In a heat exchange zone that recovers heat from carbon black smoke by preheating an oxygen-containing gas, such as air, being passed to a carbon black reaction zone, a control loop is provided that automatically diverts the oxygen-containing gas being heated through a by-pass line around a heat exchanger if the effluent smoke from the heat exchanger is below a predetermined minimum temperature.

In a specific mode of operation the by-pass flow is normally controlled in response to a signal which typifies desired preheated air temperature but in the event of low temperature smoke, a signal which typifies smoke temperature overrides the preheated air temperature signal.

The override feature of the control loop would come into play when the carbon black effluent smoke from the heat exchanger is below a predetermined minimum temperature. The temperature of the air out of the preheating zone would then be lowered by opening the by-pass until the smoke once again was at or above the predetermined minimum value.

A specific control system configuration is set forth in the drawing for the sake of illustration. However, the invention extends to different types of control system configurations which accomplish the purpose of the invention. Lines designated as signal lines in this preferred embodiment are electrical or pneumatic.

In almost all control systems some combination of electrical, pneumatic, mechanical or hydraulic signals will be used. However, the use of any other type of signal transmission, compatible with the process and equipment in use, is within the scope of the invention.

The controllers shown can utilize the various modes of control such as proportional, proportional-integral, proportional-derivative, or proportional-integral-derivative. In this preferred embodiment proportional-integral controllers are utilized but any controller capable of accepting two input signals and producing a scaled output signal, representative of a comparison of the two input signals is within the scope of the invention.

The scaling of an output signal by a controller is well known in control system art. Essentially the output of a controller can be scaled to represent any desired factor or variable. An example of this is where a desired temperature and an actual temperature are compared by a controller. The controller output could be a signal representative of a flow rate of some gas necessary to make the desired and actual temperatures equal. On the other hand the same output signal could be scaled to represent a pressure required to make the desired and actual temperatures equal. If the controller output can range from 0 to 10 volts, which is typical, then the controller output signal could be scaled so that an output signal having a voltage level of 5.0 volts corresponds to 50 percent, some specified flow rate, or some specified pressure.

In control systems utilizing select devices wherein a controller output signal may or may not be selected from two or more signals, an unselected controller is in an open loop condition. If the unselected controller has integral action, which is most often the case, it needs to be protected against windup.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types.

While the presently preferred embodiment of the invention utilizes pneumatic final control elements in conjunction with pneumatic analog handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factor, the physical characteristics of the measuring or control instruments and other similar factors.

Referring to the drawing, oil feed in line 10 is passed through heat exchanger 11 where the temperature of the feed is increased by indirect heat exchange with carbon black smoke passed therethrough. The preheated oil feed is passed by way of line 12 and introduced into carbon black reactor 13 for mixing and combustion with hot gases coming in contact with the oil feed to produce carbon black within reactor 13. Fuel gas and preheated air are introduced tangentially into carbon black reactor 13 by way of lines 14 and 15, respectively. The combination of fuel gas and air produce hot combustion gases which surround the oil feed which is preferably introduced axially into the carbon black reactor for formation of carbon black.

The carbon black reaction is quenched by introduction of water by way of line 16 near the end of the reaction zone.

The carbon black reactor effluent smoke exits the carbon black reactor at a temperature of about 2000° F. in line 17 and is passed through heat exchanger 18 where it is passed in indirect heat exchange relationship with water to form steam. Water is introduced by line 19 and steam is withdrawn through line 20 for further use as desired.

The carbon black smoke is cooled to about 1200° F. in heat exchanger 18 and the cooled smoke is passed by way of line 21 to air preheater 22 wherein it passes in indirect contact with combustion air introduced by line 27, which combustion air after preheating is subsequently introduced into the carbon black reactor as described above. The carbon black smoke removed from air preheater 22 by line 23 is reduced in temperature to about 950° F. and then passed by way of line 24 through oil preheater 11 and removed for further use as desired by way of line 25.

Air to be preheated is introduced by line 26 and 27 into air preheater 22 and passed therethrough in indirect heat exchange relationship with the carbon black smoke introduced by line 21. The preheated air is removed by line 28 and passed ultimately through line 15 into carbon black rector 13 as a source of combustion supporting gas. The temperature of the air is increased to about 800° F.

In accordance with the invention, a by-pass line 29/31 containing control valve 30 is provided so that at least a portion of the air to be preheated in line 26 can by-pass air preheater 22 when the carbon black smoke removed from preheater 22 by line 23 falls below a predetermined minimum, e.g., 750° F. If the carbon black smoke exiting from preheater 22 falls below about 750° F. fouling of the heat exchange surfaces within air preheater 22 takes place, thereby reducing heat exchange efficiency.

The temperature of the carbon black effluent smoke in line 23 is measured by temperature transducer 32 in combination with a measuring device such as a thermocouple, and a signal representative of the actual temperature in line 23 is transmitted to temperature indicating controller 33. Temperature indicator controller 33 also has a manually entered set point of about 750° F. for the predetermined minimum temperature desired in line 23. The actual temperature measured by transducer 32 is compared with the set point in temperature indicator controller 33 and a control signal representative of the temperature of preheated air in line 28 required to maintain the predetermined minimum temperature in line 23 is passed to select relay 34. Relay 34 is also provided with a manually entered set point signal 44 of 800° F. The select relay 34 establishes signal 42 which is equal to the one of signals 40 or 44 which is representative of the lower temperature.

The temperature of the air in line 28 is measured by temperature transducer 35 in combination with a measuring device such as a thermocouple, and a signal representative of the actual air temperature in line 28 is passed to temperature indicating controller 36. The input signals to controller 36 are the actual air temperature measured by transducer 35 and the signal 42 produced by select relay 34. Responsive to these two signals temperature indicator controller 36 then sends a signal to control valve 30 to either open or close valve 30 to allow air to by-pass preheater 22 responsive to the temperature condition of the smoke in line 23, or responsive to the desired temperature of the preheated air represented by signal 44, depending on the signal selected by select relay 34.

In normal operation, the temperature of the gaseous effluent containing carbon black in suspension removed from the furnace will vary after water quenching and passage through a waste heat boiler in the range of about 1100° to about 1300° F. This effluent will be cooled on passing through the coils in preheater 22 to a temperature in the range of about 900° to about 1000° F. The flow rate of gaseous effluent containing carbon black through the air preheater will be at substantially a constant flow rate. The air stream in line 26 is passed at a constant flow rate through preheater 22 and the inlet temperature of the air will vary from about 150° to 170° F. The heated air in effluent line 28 is controlled at a temperature of 800° F. unless the temperature of teh carbon black smoke in line 23 falls below the predetermined minimum air temperature of 750° C., in which case the preheated air temperature will be reduced.

As discussed above, the control system of the instant invention is so constructed and arranged as to keep the gaseous effluent containing carbon black suspension removed from the air preheater above a minimum temperature level in order to minimize the deposition of carbon on the heat exchange surfaces in preheater 22. Motor valve 30 and by-pass line 29/31 is opened or closed to regulate the flow of by-pass air responsive to temperature of the carbon black smoke temperature in exit line 23 from preheater 22.

The invention has been described in terms of a preferred embodiment as illustrated in the drawing. Specific control components which can be used in the practice of the invention as illustrated in the drawing such as temperature transducers 32 and 35, control valve 30 and temperature controllers 33 and 36 are each well known commercially available control components such as are described at length in Perry's Chemical Engineers Handbook, 4th Edition, Chapter 22, McGraw-Hill. Suitable selective relays are also commercially available.

The air preheating and flow control method and arrangement of apparatus of the invention is also applicable to other types of carbon black furnaces than the type of furnace illustrated in the drawing.

That which is claimed is:

1. In a process for producing carbon black wherein the carbon black-containing hot smoke reaction effluent is passed through a heat exchange zone in indirect heat exchange relationship with an oxygen-containing gas to preheat said oxygen-containing gas prior to introduction into a carbon black producing zone as combustion supporting medium, the improved steps of operation to minimize fouling of the surfaces of the heat exchange zone which comprise:

(a) measuring the temperature of the smoke exiting said heat exchange zone and producing a signal representative thereof;
   (b) comparing said representative signal of (a) with a first manually set temperature signal representing the minimum allowable temperature of smoke exiting said heat exchanger and producing a first comparative signal representative of the comparison of said signal of (a) with said first manually set temperature signal;
   (c) comparing said first comparative signal with a second manually set temperature signal representing the desired temperature of oxygen-containing gas exiting said heat exchanger;
   (d) selecting the signal representing the lower temperature from (1) said second manually set temperature signal and (2) said first comparative signal;
   (e) measuring the temperature of the preheated oxygen-containing gas exiting said heat exchange zone and producing a signal representative thereof;
   (f) comparing said representative signal of (e) with the selected signal of (d) thereby producing a second comparative signal representative of the comparison of said signal of (b) with said selected signal of (d); and
   (g) adjusting the flow of oxygen-containing gas through said indirect heat exchange means in response to said second comparative signal.

2. A heat exchanger control system comprising, in combination:

(a) an indirect heat exchanger having a first inlet and a first outlet of flow of heating medium and a second inlet and a second outlet for flow of a fluid to be heated;
   (b) a carbon black production means having a hot product outlet communicating with said first inlet;
   (c) a bypass conduit connected to carry fluid between said second inlet and said second outlet;
   (d) a first temperature sensing means in said first outlet;
   (e) means for setting a first set temperature signal representing a minimum allowable temperature of smoke exiting said heat exchanger;
   (f) means for (1) comparing the temperature sensed by said first temperature sensing means with said first set temperature value and (2) producing a first signal representative of the comparison;
   (g) means for setting a second set temperature signal representing the desired temperature of oxygen-containing gas exiting said heat exchanger;
   (h) means for selecting the signal representing the lower temperature from (1) said second set temperature and (2) said first signal representative of the comparison of the temperature sensed by said first temperature sensing means with said first set temperature signal;
   (i) a second temperature sensing means in said second outlet downstream of the intersection of said bypass conduit and said second outlet;
   (j) means for (1) comparing the temperature sensed by said second temperature sensing means with a lesser signal selected in (h) and (2) producing a second signal representative of the comparison; and
   (k) means for controlling flow of fluid in said bypass of (c) in response to the signal produced by (j).

* * * * *